US012601592B2

(12) United States Patent
Berger et al.

(10) Patent No.: US 12,601,592 B2
(45) Date of Patent: Apr. 14, 2026

(54) DETECTOR, OPTOELECTRONIC IMAGE RECORDING SYSTEM, AND SPACECRAFT FOR IMAGE RECORDING

(71) Applicant: Jena-Optronik GmbH, Jena (DE)

(72) Inventors: Reinhard Berger, Jena (DE); Uwe Schmidt, Bürgel (DE); Andreas Zintl, Arnstadt (DE)

(73) Assignee: Jena-Optronik GmbH (DE)

( * ) Notice: Subject to any disclaimer, the term of this patent is extended or adjusted under 35 U.S.C. 154(b) by 624 days.

(21) Appl. No.: 17/462,739

(22) Filed: Aug. 31, 2021

(65) Prior Publication Data

US 2022/0065627 A1     Mar. 3, 2022

(30) Foreign Application Priority Data

Sep. 3, 2020    (DE) ..................... 10 2020 123 064.8
Aug. 19, 2021   (EP) ..................................... 21192209

(51) Int. Cl.
    *G01C 11/02*       (2006.01)
    *H04N 25/701*     (2023.01)

(52) U.S. Cl.
    CPC ........... *G01C 11/02* (2013.01); *H04N 25/701* (2023.01)

(58) Field of Classification Search
    CPC ...................................................... G01C 11/02
    USPC ........................................................ 257/225
    See application file for complete search history.

(56) References Cited

U.S. PATENT DOCUMENTS

| | | | |
|---|---|---|---|
| 5,510,623 A | 4/1996 | Sayag et al. | |
| 2002/0037070 A1* | 3/2002 | Tang ..................... | G21K 1/025 |
| | | | 378/154 |
| 2003/0117493 A1 | 6/2003 | Holdaway et al. | |
| 2004/0251420 A1* | 12/2004 | Sun ..................... | G01T 1/20183 |
| | | | 250/370.09 |
| 2005/0134712 A1* | 6/2005 | Gruhlke ................. | H04N 23/15 |
| | | | 348/E9.01 |
| 2007/0188610 A1 | 8/2007 | Micotto et al. | |
| 2010/0133442 A1 | 6/2010 | Hansen et al. | |
| 2011/0221599 A1* | 9/2011 | Hogasten .......... | H01L 27/14621 |
| | | | 348/E17.002 |
| 2012/0087462 A1* | 4/2012 | Ikhlef .................... | G21K 1/025 |
| | | | 378/4 |

(Continued)

FOREIGN PATENT DOCUMENTS

| | | |
|---|---|---|
| DE | 10108324 A1 | 8/2002 |
| DE | 102005037860 A1 | 2/2007 |
| JP | 2013 138222 A | 7/2013 |

OTHER PUBLICATIONS

European Patent Office; Search Report in related European Patent Application No. 21 192 209.1 dated Jan. 5, 2022; 7 pages.

(Continued)

*Primary Examiner* — Dzung Tran

(74) *Attorney, Agent, or Firm* — Dorton & Willis, LLP

(57) ABSTRACT

A detector for image recording, in particular for an optoelectronic image recording system for a spacecraft, includes a carrier substrate and an optoelectronic element arranged on the carrier substrate. At least in one end region, the carrier substrate has at least one side surface running obliquely to the longitudinal direction of the carrier substrate. An optoelectronic image recording system for a spacecraft includes a carrier plate and such a detector. A spacecraft includes such a detector and/or such an optoelectronic image recording system.

29 Claims, 4 Drawing Sheets

(56)                     References Cited

U.S. PATENT DOCUMENTS

| | | | |
|---|---|---|---|
| 2012/0273913 A1 | 11/2012 | Ma et al. | |
| 2014/0139643 A1 | 5/2014 | Högasten et al. | |
| 2016/0070004 A1* | 3/2016 | Liu | H01L 27/14607 |
| | | | 250/369 |
| 2017/0265822 A1 | 9/2017 | Du | |
| 2019/0141261 A1* | 5/2019 | Högasten | H04N 5/33 |

OTHER PUBLICATIONS

German Patent Office; Office Action in related German Patent Application No. 10 2020 123 064.8 dated Apr. 2021; 7 pages.
European Patent Office; Office Action in related European Patent Application No. 21 192 209.1 dated Feb. 15, 2024; 7 pages.

* cited by examiner

500

504

512

510     508

512

512

508

508

512     502     512

506

600

602

DETECTOR, OPTOELECTRONIC IMAGE RECORDING SYSTEM, AND SPACECRAFT FOR IMAGE RECORDING

CROSS-REFERENCE TO RELATED APPLICATIONS

This application claims the benefit of priority under 35 U.S.C. § 119(a) to German Patent Application DE 10 2020 123 064.8, filed Sep. 3, 2020 (pending), and European Patent Application EP 21 192 209.1, filed Aug. 19, 2021 (pending), the disclosure of which is incorporated by reference in its entirety.

TECHNICAL FIELD

The invention relates to a detector for image recording, in particular for an optoelectronic image recording system for a spacecraft, comprising a carrier substrate and an optoelectronic element arranged on the carrier substrate. The invention also relates to an optoelectronic image recording system comprising the detector and to a corresponding spacecraft.

BACKGROUND

Optoelectronic image recording systems are used, for example, in the field of space travel for earth observation. Typically, such image recording systems have optics, a detector in an image plane, and electronics. A combination of a plurality of detectors is necessary for high-resolution earth observation. The detectors are usually designed as a line with a corresponding resolution. Depending on the application, a plurality of detector lines can be combined with one another in order to be able to record a larger range with a larger swath width. It is necessary in this case for the detectors to cover one another or overlap in the edge region, in particular in the longitudinal direction. A plurality of line detectors can therefore be arranged as an array on the image plane or focal plane (focal plane assembly, FPA). The detectors usually have a rectangular casing design or a rectangular carrier substrate. Due to the rectangular casing design and the necessary overlap, there is unused space between the detector lines. As a result, the image plane or the focal plane has a correspondingly large surface area. As a result, larger optics are necessary in order to be able to cover or expose the entire image plane or focal plane. In particular in the aerospace industry, size and weight play a significant role.

Another feature of high-resolution earth observation is the high data rates due to the high number of pixels at a high line rate. The preprocessed pixel information is typically processed further via a digital interface.

In the case of high-resolution sensors, different spectral ranges are usually examined. Each detector line can be optimized for a separate spectral range. However, the previous solutions can only map a comparatively small number of spectral channels, since the required number of spectral channels or detector lines cannot be arranged next to one another with sufficient pixel overlap regions on the carrier plate within the imaging region of the optics in the image plane. The very high number of pins, which have to be used both for controlling the sensors and for digitizing the pixel data, are an additional aggravating factor. Due to the low integration density, the galvanic separation can also only take place on the peripheral electronics. This often results in a loss in performance.

SUMMARY

The invention is based on the object of structurally and/or functionally improving an above-mentioned detector. The invention is also based on the object of structurally and/or functionally improving an above-mentioned optoelectronic image recording system. The invention is also based on the object of structurally and/or functionally improving a spacecraft for image recording mentioned at the outset.

In particular, the invention is based on the object of designing a detector for image recording and an optoelectronic image recording system, in particular for earth observation, to be more compact and to reduce the image plane or focal plane area. Another object of the invention is to increase the integration density, in particular on the image plane or focal plane, and to improve the performance.

The object is achieved with a detector, an optoelectronic image recording system, and a spacecraft as described herein.

The detector can be used for image recording. The detector can be for an optoelectronic image recording system or be arranged there. The detector can be for a spacecraft or be arranged there. The detector can be used for earth observation, in particular for high-resolution earth observation. The detector can be a detector line.

The detector can have a carrier substrate. The carrier substrate can be a casing or be designed as a casing. The carrier substrate can be a hybrid structure or a hybrid casing. The detector can have an optoelectronic element. The optoelectronic element can be arranged on and/or on top of the carrier substrate. The optoelectronic element can be arranged in the carrier substrate designed as a casing. The carrier substrate can have at least one end region or end. The carrier substrate can have two opposite end regions or ends in the longitudinal direction. At least one end region of the carrier substrate can be provided with at least one side surface running obliquely to the longitudinal direction of the carrier substrate. The carrier substrate can have at least one taper. The at least one obliquely running side surface can form or define the at least one taper of the carrier substrate. At least one side and/or edge of the carrier substrate can be tapered, in particular in an end region of the carrier substrate. Two sides, such as side surfaces and/or edges of the carrier substrate can be tapered, in particular in an end region of the carrier substrate. The two side surfaces of the carrier substrate can each be tapered in the two opposite end regions of the carrier substrate. As a result, side surfaces running obliquely to the longitudinal direction of the carrier substrate can be formed. This can allow for a more compact arrangement with a corresponding overlap of detectors. The image plane or focal plane area (FPA area) can thereby be minimized.

Unless otherwise stated or if nothing else arises from the context, the specification "longitudinal direction" relates to a direction of the longest extent or extension of the carrier substrate and the specification "transverse direction" relates to a direction perpendicular to the longitudinal direction and horizontal in particular with regard to the carrier substrate. The longitudinal direction can be a longitudinal extension of the carrier substrate and/or detector. The longitudinal direction can lie in the horizontal or horizontal plane. A "longitudinal axis" can extend in the longitudinal direction. The longitudinal axis can be an axis of symmetry of the detector and/or the carrier substrate, for example an axis of symmetry in the horizontal plane and/or horizontal sectional plane of the detector and/or the carrier substrate. The longitudinal direction can be defined by an alignment and/or longitudinal extension of at least one pixel line of the detector. The longitudinal direction can be parallel to the alignment and/or longitudinal extension of at least one pixel line of the detector. The transverse direction can relate to a direction of the shortest extent or extension of the carrier substrate in the horizontal or horizontal plane. The transverse direction can lie in the horizontal or horizontal plane. A "transverse axis" can extend in the transverse direction and thus perpendicular to the longitudinal direction. The transverse direction can be perpendicular to the alignment and/or longitudinal extension of at least one pixel line of the detector. For example, the longitudinal direction can run in a direction of the longest extension of the carrier substrate and/or run perpendicular to the transverse direction, wherein the transverse direction can run in a direction of the shortest extension of the carrier substrate.

The at least one obliquely running side surface of the carrier substrate can slope inward. The at least one obliquely running side surface can be arranged obliquely to the longitudinal axis of the carrier substrate. A direction of extension of the at least one obliquely running side surface can enclose an angle with the longitudinal direction and/or longitudinal axis of the carrier substrate. The angle can be between 0° and 90°, in particular between 0° and 45°, preferably between 10° and 30°. For example, the angle can be about 15°. The direction of extension can be substantially parallel to the horizontal, in particular of the carrier substrate.

At least one end region of the carrier substrate can be tapered, in particular seen in the longitudinal section comprising the transverse axis. At least one end region of the carrier substrate can be designed in a trapezoidal, triangular or conical shape, in particular seen in the longitudinal section comprising the transverse axis. At least one end region of the carrier substrate can be tapered in a trapezoidal, triangular or conical shape, in particular seen in the longitudinal section comprising the transverse axis. At least one end region of the carrier substrate can substantially have the shape of a right-angled or isosceles trapezoid, in particular seen in the longitudinal section comprising the transverse axis. At least one end region of the carrier substrate can substantially have the shape of an equilateral or isosceles triangle, in particular seen in the longitudinal section comprising the transverse axis. At least one end region of the carrier substrate can be designed as a point or in the form of a point.

At least in one end region of the carrier substrate, two side surfaces running obliquely to the longitudinal direction of the carrier substrate can be provided. The two obliquely running side surfaces of the carrier substrate can be arranged opposite one another, in particular in the transverse direction of the carrier substrate. The two obliquely running side surfaces of the carrier substrate can slope inward. In particular, the two obliquely running side surfaces of the carrier substrate can slope inward toward the end of the carrier substrate. The two end regions of the carrier substrate which are opposite in the longitudinal direction can each have two side surfaces running obliquely to the longitudinal direction of the carrier substrate.

At least in one end region or at least at one end of the carrier substrate, the carrier substrate can have a fastening structure for fastening the detector to a carrier plate or a casing. The two end regions or ends of the carrier substrate which are opposite in the longitudinal direction can each have a fastening structure. The fastening structure can have a bore for receiving a fastening means, such as a screw or a pin. The fastening structure can be designed in a step-like manner.

The optoelectronic element can extend substantially in the longitudinal direction of the carrier substrate. The optoelectronic element can be a light-sensitive chip. The optoelectronic element can be a CMOS chip and/or have an active pixel technology. The optoelectronic element can be a CCD chip, a photodiode or the like.

The optoelectronic element can be a line-shaped light-sensitive chip and/or, in particular in the longitudinal direction thereof and/or in the longitudinal direction of the carrier substrate, have a line, such as a pixel line, having a plurality of pixels. The longitudinal direction of the optoelectronic element can be parallel to the longitudinal direction of the carrier substrate. The optoelectronic element can for example have between 1,000 and 30,000 pixels, in particular between 5,000 and 25,000 pixels, preferably approximately 10,000 or approximately 20,000 pixels as a pixel line. The optoelectronic element, in particular in the transverse direction thereof and/or in the transverse direction of the carrier substrate, can have a number of sub-lines arranged parallel to one another, such as sub-pixel lines, each having a plurality of pixels. The transverse direction of the optoelectronic element can be parallel to the transverse direction of the carrier substrate. The optoelectronic element can, for example, have a number corresponding to a power of 2, in particular up to 512 or 1024, sub-lines. The pixel line can have a plurality of sub-pixel lines. In particular when the detector is in operation, the sub-lines can serve or be used for exposure and/or, in particular in columns, for upward integration, one after the other with a time offset, of the electrical charges generated by exposure. This can increase the sensitivity of the detector and/or improve the signal-to-noise ratio. This process is called time delay and integration (TDI for short). The detector can be designed and/or configured to use and/or execute the TDI method. The sub-lines can be designed and configured in such a way that they are exposed with a time offset, for example one after the other. The detector can be designed in such a way that the sub-lines can be exposed with a time offset, for example one after the other. The detector and/or a signal processing and/or readout circuit of the detector can be designed to integrate, in particular to upwardly integrate, the electrical charges generated in the sub-lines by exposure in columns.

The detector can have a filter element. The filter element can extend in the longitudinal direction of the carrier substrate. The filter element can be arranged directly on the optoelectronic element. This allows stray light and/or optical reflections to be minimized. The filter element can be arranged at a distance from the optoelectronic element. This arrangement is more fault tolerant with regard to surface defects, in particular on the filter element. The filter element can be at a distance from the optoelectronic element. This can be a defined and/or predetermined distance. The filter element can be a spectral filter and/or a bandpass filter. A compensation element can be arranged between the filter element and the optoelectronic element. The compensation element can be a filler, in particular an optically transparent filler. The compensation element and/or the filler can be an adhesive. The filter element can be glued onto the optoelectronic element.

The detector can have a signal processing and/or readout circuit or readout electronics. The signal processing and/or readout circuit can be arranged between the optoelectronic element and the carrier substrate. The signal processing and/or readout circuit can be operatively connected to the optoelectronic element, for example via a wafer-to-wafer connection. The signal processing and/or readout circuit can be an integrated signal processing and/or readout circuit. The signal processing and/or readout circuit can be a read out integrated circuit (ROIC). The signal processing and/or readout circuit can be designed to convert and/or further process the analog electrical signals generated by light in the optoelectronic element. The signal processing and/or readout circuit can be connected, in particular fixed, to the carrier substrate.

The detector can have one or more passive circuit elements. The passive circuit elements can be permanently connected to the carrier substrate or arranged thereon. The one or more passive circuit elements can be operatively connected to the signal processing and/or readout circuit, for example by bonding, such as wire bonding.

The detector can have at least one electrical module for, in particular electrical, signal transmission. The detector can have at least one optical module for, in particular optical, digital signal transmission. The signal transmission can be a data transmission. The optical module can be an optical link module or an optical fiber link. The electrical module and/or the optical module can be arranged on the carrier substrate or be permanently connected thereto. The electrical module and/or the optical module can be arranged substantially below the signal processing and/or readout circuit. The electrical module and/or the optical module can be arranged on the underside of the detector and/or carrier substrate. Openings for the electrical modules and/or the optical modules can be reduced. This allows a larger contact area, in particular on the underside of the detector and/or carrier substrate, for improved heat dissipation. The electrical module and/or the optical module can be operatively, in particular electrically, connected to the signal processing and/or readout circuit. The signal processing and/or readout circuit can be designed to process and/or convert and/or forward the electrical signals generated by light in the optoelectronic element. The signal processing and/or readout circuit can have one or more analog-to-digital converters. The carrier substrate can have at least one electrical connection, for example one or more conductor tracks. The signal processing and/or readout circuit can be electrically connected to the at least one electrical connection of the carrier substrate, for example by means of an electrical connection, such as a bond connection. The at least one electrical module and/or the at least one optical module can be operatively, in particular electrically, connected to the at least one electrical connection of the carrier substrate. The signal processing and/or readout circuit can be operatively, in particular electrically, connected via the at least one electrical connection of the carrier substrate to the at least one electrical module and/or at least one optical module. The signal processing and/or readout circuit can be designed to forward the electrical signals generated by light in the optoelectronic element and/or the converted/processed signals via the electrical connection of the carrier substrate to the at least one electrical module and/or at least one optical module. The electrical module and/or the optical module can be designed for analog and/or digital signal processing and/or signal forwarding or signal transmission. The electrical module and/or the optical module can have a fiber optic element, such as a fiber optic connection, a fiber optic cable, or an optical fiber. The optical module can be designed to transmit data or signals via a glass fiber. The optical module can allow for an improved signal range. Reduced contact with the detector is also possible. The detector and/or the carrier substrate can be designed so that the electrical contact and/or the signals can be supplied and/or removed via the underside of the detector or the carrier substrate.

The detector can have at least one electrical contact. The electrical contact can be arranged on the underside of the detector and/or the carrier substrate. The electrical contact can be arranged in a, for example, lower edge region and/or on a, for example, lower edge, in particular of the carrier substrate. As a result, an improved heat transport, in particular in the center, of the carrier substrate can be made possible. The electrical contact or the electrical contacts can be arranged symmetrically or asymmetrically with respect to the carrier substrate and/or a longitudinal direction or transverse direction of the carrier substrate. The electrical contact or the electrical contacts can be arranged offset to one another, in particular in the longitudinal direction and/or transverse direction. This allows for a closer arrangement of detectors.

At least in portions, the carrier substrate can be substantially U-shaped and/or H-shaped in cross section. The detector and/or the carrier substrate can be made from ceramics. The carrier substrate can be a ceramic substrate. The detector and/or the carrier substrate can be produced by means of an additive production method or by means of 3D printing. This allows the variety of geometries to be increased. Printed circuits and/or heat dissipators can also be provided. The detector and/or the carrier substrate can have an internal circuit. The detector and/or the carrier substrate can have high-temperature cofired ceramics (HTCC) or be designed as high-temperature cofired ceramics. The detector and/or the carrier substrate can have a ceramic film which can be used as a circuit carrier. The detector and/or the carrier substrate can have low-temperature cofired ceramics (LTCC) or be designed as low-temperature cofired ceramics. The installation space, in particular for passive components on the front of the detector, can thus be reduced. The detector and/or the carrier substrate can have a sintered ceramic carrier. The detector and/or the carrier substrate can have integrated metal elements. The metal elements can be integrated in a ceramic substrate. The metal elements can be metal layers or metal cores. The metal elements can be used for heat conduction and/or heat distribution. This allows for a targeted heat conduction and thus the heat distribution and spreading can be optimized. The detector and/or the carrier substrate can have channels such as micro channels (micro channel heat pipes). The channels can serve for heat conduction, in particular heat dissipation. This allows for a forced dissipation of waste heat.

The detector can have a protective element, such as protective glass or a protective pane. The protective element can be arranged on the upper side of the detector and/or of the carrier substrate. The protective element can extend in the longitudinal direction and/or in the transverse direction of the carrier substrate. The protective element can partially or completely cover the upper side of the carrier substrate. The protective element can be fixedly connected to the carrier substrate. The protective element can be arranged above the optoelectronic element. The protective element can be designed to be optically transparent. The filter element can be integrated in the protective element. The protective element can have at least one optically non-transparent region. The protective element can have at least one optically transparent region. The protective element can have at least two optically non-transparent regions and one optically transparent region arranged therebetween. Alternatively, the filter element can be arranged between the two optically non-transparent regions of the protective element. The optically transparent region of the protective element can be arranged above the optoelectronic element. The optically transparent region of the protective element can be arranged above the filter element. The protective element can minimize contamination. The protective element can serve as protection in the event of errors in handling.

An optoelectronic image recording system can be for a spacecraft. The optoelectronic image recording system can be used for earth observation, in particular for high-resolution earth observation. The optoelectronic image recording system can have a carrier plate. The optoelectronic image recording system can have at least one detector. The at least one detector can be designed as described above and/or below. The at least one detector can be arranged on the carrier plate, in particular in an image plane and/or focal plane. The carrier plate can have or define the image plane and/or focal plane. The at least one detector can be arranged on the carrier plate within an imaging region of an optical system in the image plane.

The optoelectronic image recording system can have at least two detectors. The at least two detectors can be arranged on the carrier plate in such a way that they overlap at least in portions in the longitudinal direction, in particular in the end region of the carrier substrate. The at least two detectors can be arranged on the carrier plate in such a way that in the longitudinal direction, the lines having a plurality of pixels, such as pixel lines, and/or the sub-lines each having a plurality of pixels, such as sub-pixel lines, of the at least two detectors, overlap, at least in portions, in particular in the end region of the carrier substrate. The at least two detectors can be arranged on the carrier plate in such a way that in the transverse direction, the lines having a plurality of pixels, such as pixel lines, and/or the sub-lines each having a plurality of pixels, such as sub-pixel lines, of the at least two detectors, are arranged one behind the other, at least in portions, in particular in the end region of the carrier substrate. The at least two detectors can be arranged on the carrier plate substantially parallel to one another and/or substantially one behind the other in the longitudinal direction. For example, three detectors can be arranged in the longitudinal direction substantially one behind the other and/or overlapping on the carrier plate. In the transverse direction, two or more, for example seven, detectors can be arranged on the carrier plate. In the transverse direction, the two or more detectors can be arranged substantially parallel on the carrier plate. The optoelectronic image recording system can thus have, for example, a matrix of 21 detectors, which form a detector group. The detectors and/or the detector group and/or the pixel lines and/or the sub-pixel lines can be designed to detect different spectral ranges, in particular in different lines of the matrix.

The optoelectronic image recording system can have optics that focus on the at least one detector and/or on an image plane or focal plane. The optics can be designed to focus on a single detector and/or on a group of detectors. The optics can be designed to focus one after the other on individual detectors, in particular in terms of time. The optics can be designed to focus on a single pixel line of the detector and/or on one or more sub-lines of the detector. The optics can be designed to focus one after the other on individual pixel lines of the detectors, in particular in terms of time. The optics can be designed to focus one after the other on individual or a plurality of sub-lines of a detector or a plurality of detectors, in particular in terms of time. The optics can, for example, be designed as an objective or have an objective. The optics can, for example, be designed as a telescope or have a telescope. The optics can have one or more lenses and/or mirrors. The optics can have a tube. The one or more lenses and/or mirrors can be arranged in the tube. The optics can have a motor, such as a stepping motor, for adjusting one or more lenses and/or mirrors. The optics can be designed to achieve a defined and/or predetermined imaging effect and/or imaging quality. The optics can have one or more field correctors, such as a field flattening lens or field flattening lens arrangement, or a "field flattener." The field corrector or field flattener can be designed to flatten the image surface. The field corrector or field flattener can be arranged downstream of a lens, a lens arrangement, an objective, or a telescope and/or can be arranged in front of the at least one detector. The field corrector can be used to flatten the image field. The field corrector can serve to prevent or at least reduce the field curvature, the Petzval curvature, and/or spherical aberration.

The optoelectronic image recording system can have a connection frame. The connection frame can be fastened to the carrier plate. The connection frame can be designed to fix the carrier plate to the optics. The optoelectronic image recording system can have electronics. The electronics can be arranged below the carrier plate. The electronics can be arranged on the side of the carrier plate opposite the detectors. The optoelectronic image recording system can have at least one isostatic fastening or one isostatic suspension. The at least one isostatic suspension can be fastened to the carrier plate, to the connection frame, and/or to the electronics. The at least one isostatic suspension can be designed to connect the carrier plate to the connection frame. The at least one isostatic suspension can be designed to connect the carrier plate to the electronics.

A spacecraft can have at least one detector. The at least one detector can be designed as described above and/or below. A spacecraft can have at least one optoelectronic image recording system. The at least one optoelectronic image recording system can be designed as described above and/or below. The spacecraft can be used for earth observation, in particular for high-resolution earth observation. The spacecraft can be a satellite, in particular an artificial satellite, for example an earth satellite, a space probe, for example an orbiter, a rocket, a space shuttle, a spaceship, a spacecraft, a space capsule, a space station, or the like. The spacecraft can be designed to move in space or to be brought there. The spacecraft can be a space missile. The spacecraft can be designed to be placed in an earth orbit and/or to move and/or to hover in an earth orbit. The spacecraft can have a drive, such as a rocket drive, such as brake and/or control nozzles, or the like.

In summary and in other words, the invention thus provides, among other things, a detector with integrated analog-digital conversion for high-resolution earth observation. The detector can be a detector line having sub-lines for the exposure and upward integration, one after the other with a time offset, of electrical charges generated by exposure (time delay and integration method). The light can reach a light-sensitive chip of the detector through a spectral filter. An optically transparent filler, such as an adhesive, can be provided as a compensation element between the filter and the light-sensitive chip. The light-sensitive chip can be connected to an integrated signal processing and/or readout circuit, such as a read out integrated circuit (ROIC), for example via a wafer-to-wafer connection. The integrated signal processing and/or readout circuit can have integrated analog-to-digital converters. The integrated signal processing and/or readout circuit can be connected to the casing, such as the hybrid casing, of the detector. The casing can have a substrate, such as a ceramic substrate. The ceramic substrate can have at least partially internal circuits, for example implemented by high-temperature cofired ceramics (HTCC) and/or low-temperature cofired ceramics (LTCC). The installation space for passive components on the front of the detector can thereby be reduced. The ceramics can be 3D printed to allow for a variety of geometries, printed circuits, and/or heat dissipation. The ceramic substrate can have integrated metal components, such as layers or cores, whereby the heat distribution and spreading can be optimized through targeted heat conduction. Micro channels, such as micro channel heat pipes, can be provided for the forced dissipation of heat. Passive circuit elements and/or optical modules such as glass fiber modules, optical link modules, or optical fiber links can be accommodated on or in the casing and/or substrate. The optical modules can allow for a serial data transmission via glass fibers. The use of optical modules can improve the signal range compared to electrical data transmission. Furthermore, the contacts in the detector line can be reduced. The optical modules or optical links can be arranged on the rear of the detector for data transmission. Therefore, there is no need to lay the fibers on the front surface of the detector. The number of openings for the optical modules can be minimized. As a result, improved heat transport can take place through a larger contact area. The electrical contact and/or the preferably optical signals can be supplied and/or removed via the underside of the detector. The electrical contact can be implemented in the edge region of the detector. The electrical contact can be implemented symmetrically or asymmetrically on the detector. An asymmetrical embodiment can allow for a closer arrangement of detectors. Furthermore, an improved heat transport can be realized in the center of the ceramic carrier. The spectral filter can be integrated directly on the light-sensitive chip, but also with a defined distance. While the optical scattering effects, for example through scattered light or optical reflections, are minimized within the detector with a direct integration of the filter, the structure with a defined distance is more advantageous with regard to possible surface defects on the filter. The detector can have a protective glass, as a result of which contamination can be minimized and protection in the event of errors in handling can be made possible. One or more tapers can be present at the end of the detector line. The taper can be implemented, for example, on one, two, or more edges of the detector line. All sides of the detector can be tapered. One or more detectors can be arranged on an image plane or focal plane, such as focal plane assembly (FPA). Due to the tapers at the end of the detector line, the detectors can be arranged much more densely by means of a corresponding overlap, i.e. the detector lines are moved closer together with a corresponding overlap. The FPA can thereby be minimized. An image recording system can have a carrier plate, a connection frame, electronics, and an isostatic suspension. The carrier plate, the connection frame, and the electronics can be connected to one another by means of the isostatic suspension. A plurality of detectors can be arranged on the carrier plate.

With the invention, a detector for high-resolution earth observation and a corresponding optoelectronic image recording system are made more compact. The image plane or focal plane is reduced in size and used more efficiently. The integration density on the image plane or focal plane is increased and the performance is improved.

Embodiments of the invention are described in more detail below with reference to figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
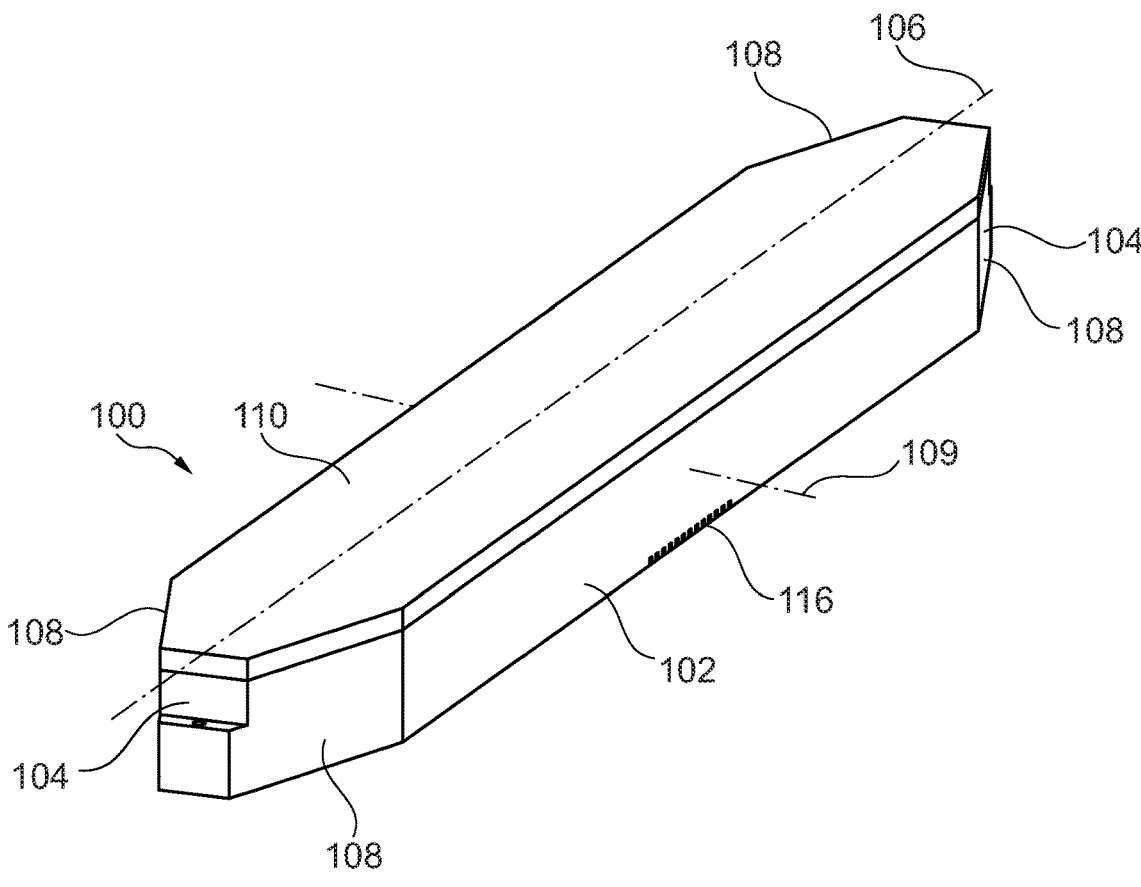
FIG. 1 is a perspective view of an exemplary detector in accordance with the principles of the present disclosure.
Figure 2:
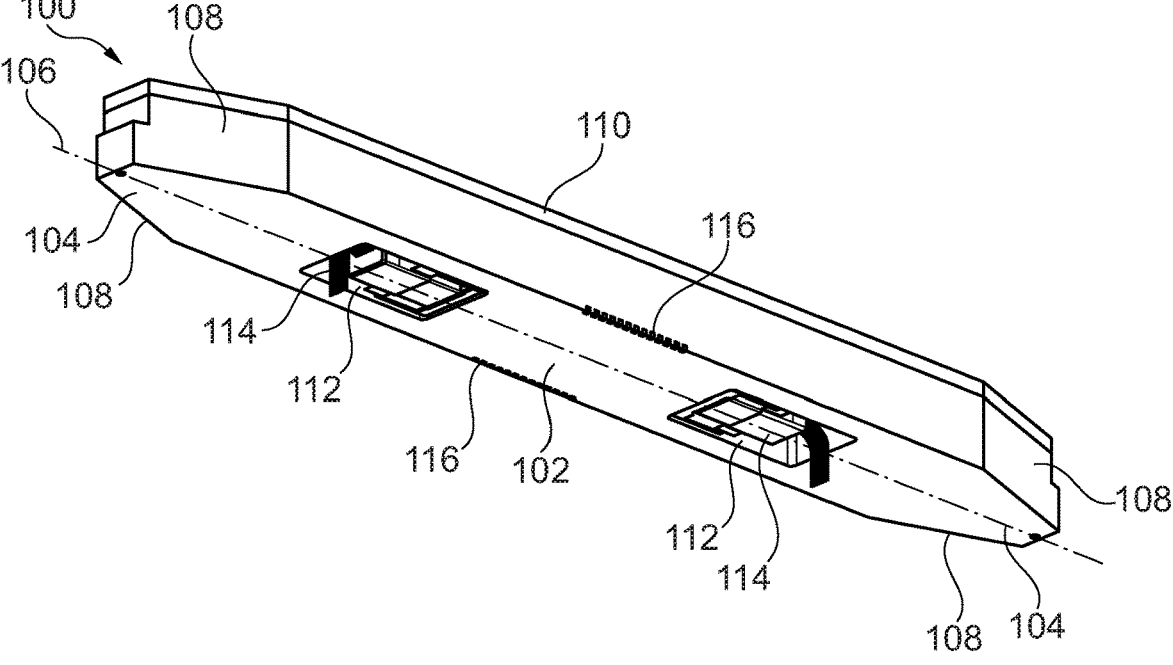
FIG. 2 is a perspective view from below of detector of FIG. 1.

FIGS. 1 and 2 show an exemplary detector 100 for image recording, in particular for high-resolution earth observation, in accordance with the principles of the present disclosure. The detector 100 can be arranged in an optoelectronic image recording system which is arranged in a spacecraft. The detector 100 has a carrier substrate 102 made of ceramics as a casing. An optoelectronic element designed as a light-sensitive chip (not shown in FIGS. 1 and 2) is arranged on the carrier substrate 102 or in the casing. The carrier substrate 102 has two opposite end regions 104. In the end regions 104, the carrier substrate 102 has two side surfaces 108 each running obliquely to the longitudinal direction 106 of the carrier substrate 102. The obliquely running side surfaces 108 slope inward. In each end region 104 of the carrier substrate 102, the two side surfaces 108 are arranged opposite one another with respect to the longitudinal direction 106 and taper outward as a triangular point, in particular seen in the longitudinal section comprising the transverse axis 109.

The detector also has a protective glass 110 which is arranged on the upper side of the carrier substrate 102. The protective glass 110 can have a spectral filter which is arranged above the light-sensitive chip. On the underside of the carrier substrate 102 there are two openings 112 in which optical modules 114 designed as optical link modules are arranged. The optical modules 114 have a fiber optic connection for digital signal transmission. An electrical contact 116 is attached to each of the two lower edges of the carrier substrate 102. The two electrical contacts 116 are arranged substantially in the center.

Figure 3:
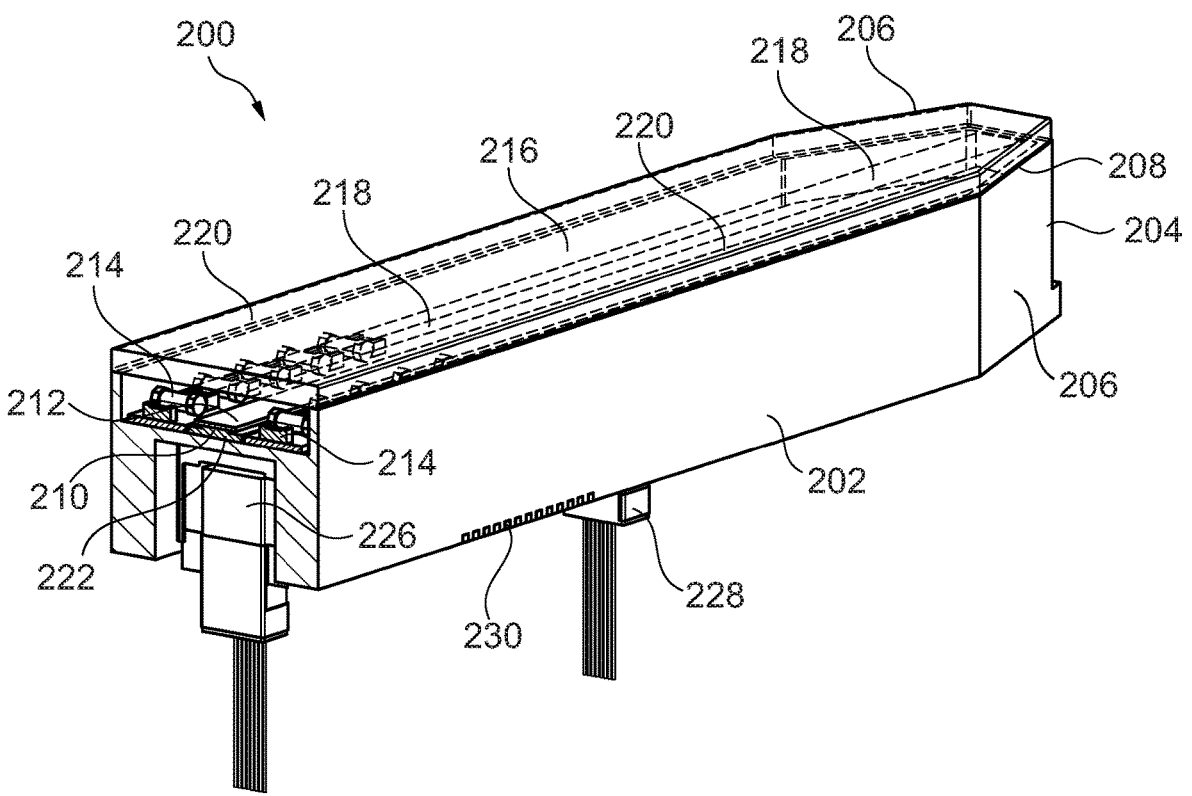
FIG. 3 is a perspective sectional view of another exemplary detector in accordance with the principles of the present disclosure.
Figure 4:
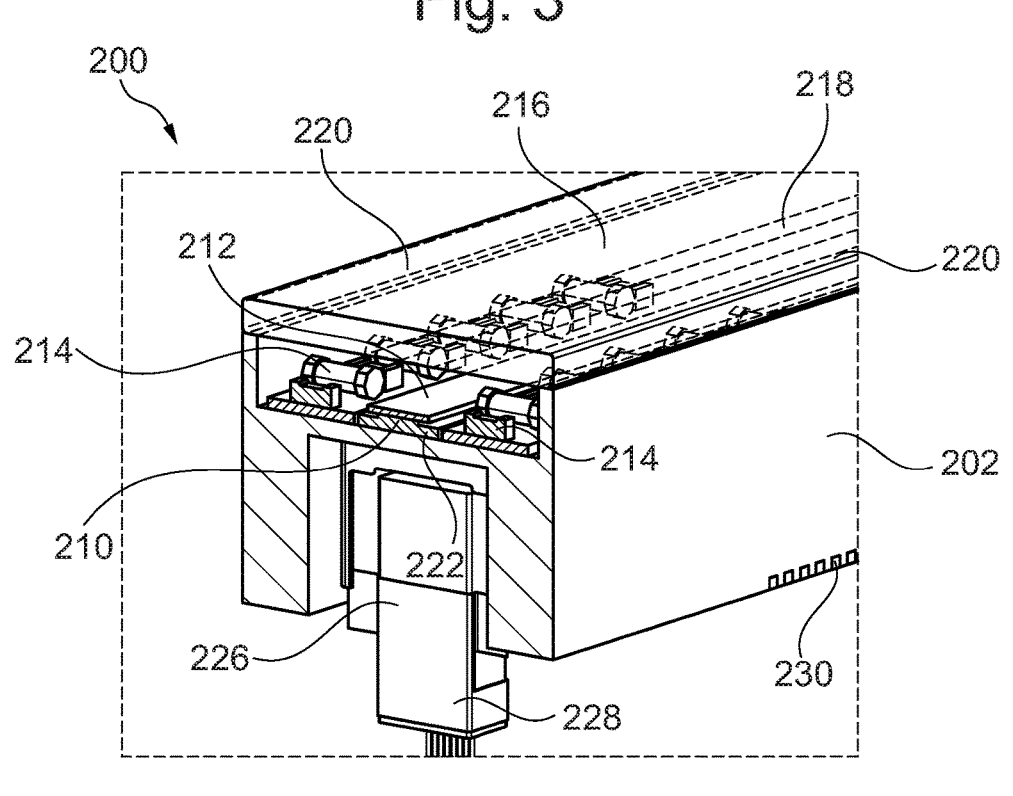
FIG. 4 is an enlarged sectional view of the detector of FIG. 3.

FIGS. 3 and 4 show another exemplary detector 200 designed similar to the detector 100 according to FIGS. 1 and 2 in a perspective sectional view. The detector 200 also has a carrier substrate 202 made of ceramics as a casing. In portions, the carrier substrate 202 is substantially H-shaped and/or U-shaped in cross section. At least in one end region 204 of the carrier substrate 202, there are two obliquely running side surfaces 206 which are arranged opposite one another with respect to the longitudinal direction of the carrier substrate 202 and which slope inwardly. The end region 204 therefore has a taper. The two obliquely running side surfaces 206 are arranged opposite one another in the transverse direction of the carrier substrate 202. In the end region 204 of the carrier substrate 202, seen in the longitudinal section comprising the transverse axis, the two obliquely running side surfaces 206 taper outward in a trapezoidal shape. In the present embodiment, the two oblique side surfaces 206, in the end region 204 of the carrier substrate 202, seen in the longitudinal section comprising the transverse axis, substantially form the shape of an isosceles trapezoid 208.

The detector 200 also has an optoelectronic element 210 arranged on the carrier substrate 202 in the longitudinal direction. The optoelectronic element 210 is a light-sensitive chip. A spectral filter 212 is glued to the light-sensitive chip 210 by means of an optically transparent adhesive. The spectral filter 212 is thus attached directly to the light-sensitive chip without any substantial spacing. An integrated signal processing and readout circuit 222 designed as a read out integrated circuit (ROIC) is arranged below the light-sensitive chip 210. The integrated signal processing and readout circuit 222 is operatively connected to the light-sensitive chip 210 via a wafer-to-wafer connection. In addition to the combination of light-sensitive chip 210 and integrated signal processing and readout circuit 222, passive circuit elements 214 are arranged. The passive circuit elements 214 are operatively connected to the integrated signal processing and readout circuit 222, for example by means of bonding. A protective glass 216 is fastened to the carrier substrate 202 at a distance above the spectral filter 212. The protective glass 216 is designed as a protective pane and is optically transparent in an inner region 218 and optically opaque in an outer region 220. The inner region 218 of the protective glass 216 is located above the light-sensitive chip 210 and the spectral filter 212. The outer region 220 of the protective glass 216 is located above the passive circuit elements 214. The protective glass 216 is adapted to the shape of the carrier substrate 202. The light passes through the protective glass 216 and through the spectral filter 212 onto the light-sensitive chip 210. The integrated signal processing and readout circuit 222, the light-sensitive chip 210, the spectral filter 212, and the passive circuit elements 214 are arranged in a portion of the carrier substrate 202 with a U-shaped cross section and the protective glass 216 is fastened above to the legs of the U-shaped portion.

Below the integrated signal processing and readout circuit 222, the detector has openings 224 in which optical modules 226 are arranged. The optical modules 226 are designed as optical link modules and have a fiber optic connection 228 for digital signal transmission. The integrated signal processing and readout circuit 222 is operatively connected to the optical modules 226. Electrical contacts 230 are also provided in the lower edge region of the carrier substrate.

In addition, reference is made in particular to FIGS. 1 and 2 and the associated description.

Figure 5:
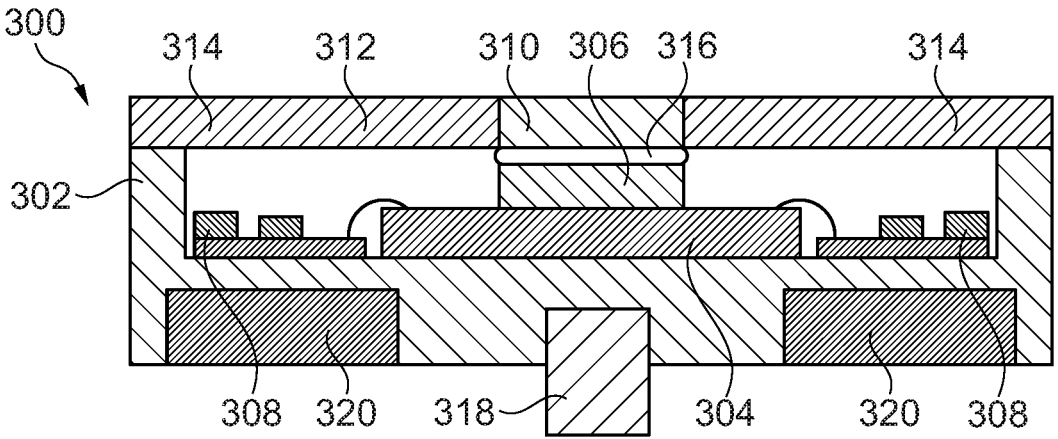
FIG. 5 is a schematic sectional view of another exemplary detector in accordance with the principles of the present disclosure.

FIG. 5 schematically shows a cross section of another exemplary detector 300. The detector 300 has a ceramic substrate 302 designed as a carrier substrate. An integrated signal processing and readout circuit 304 is arranged on the ceramic substrate 302 and is connected to the ceramic substrate 302. The integrated signal processing and readout circuit 304 is designed as a read out integrated circuit (ROIC). A light-sensitive chip 306 is arranged on the integrated signal processing and readout circuit 304. The light-sensitive chip 306 is operatively connected to the integrated signal processing and readout circuit 304 via a wafer-to-wafer connection. In addition to (left and right in FIG. 5) the integrated signal processing and readout circuit 304, passive circuit elements 308, such as SMD components, are arranged, which are operatively connected to the integrated signal processing and readout circuit 304 by means of wire bonding.

Above the light-sensitive chip 306, a spectral filter 310 is arranged at a defined distance. The spectral filter is part of a protective pane 312 which is fastened to the ceramic substrate 302. In addition to (left and right in FIG. 5) the spectral filter 210, the protective pane 312 has two optically opaque regions 314 which serve as a cover. In the region between the spectral filter 310 and the light-sensitive chip 306, an optically transparent filler 316, for example adhesive, is present. A connection 318 and optical connection modules 320, such as optical fiber links and/or optical link modules, are present on the underside of the ceramic substrate 302. The electrical contact and the optical signals can thus be supplied and/or discharged via the underside.

In addition, reference is made in particular to FIGS. 1 to 4 and the associated description.

Figure 6:
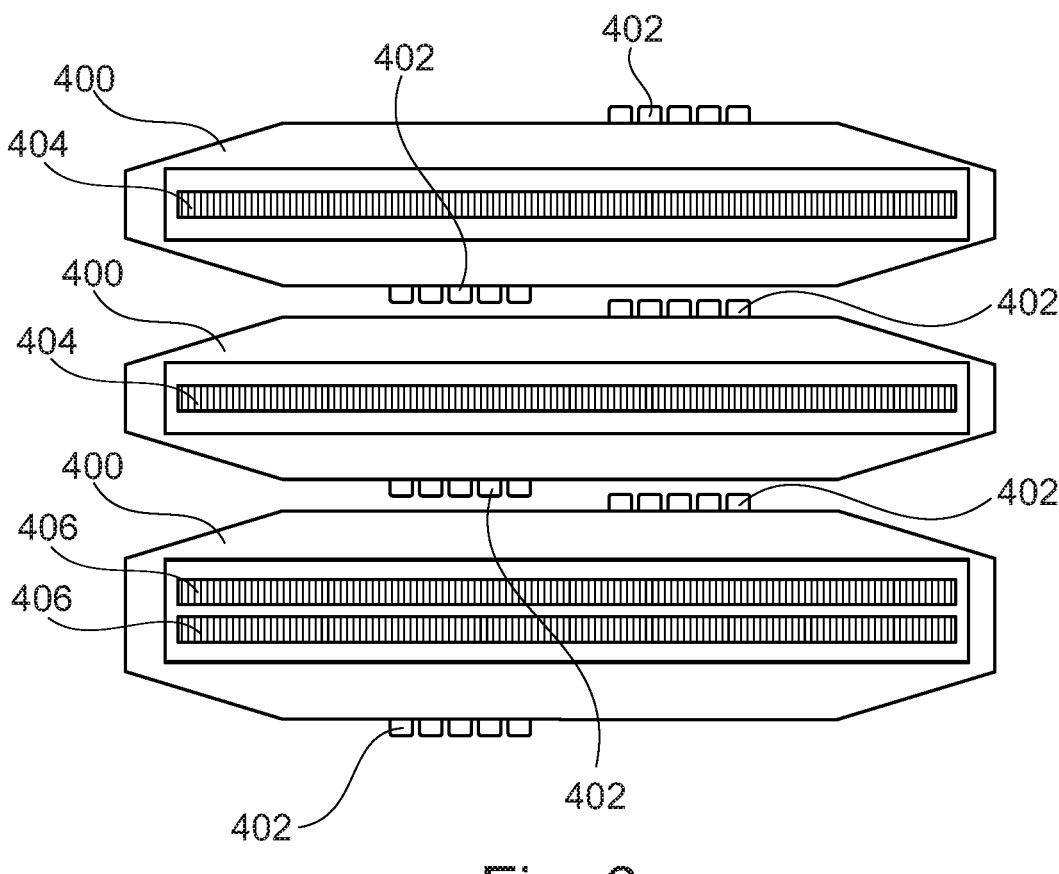
FIG. 6 illustrates an arrangement of three detectors.

An exemplary arrangement of three detectors 400 is shown schematically in FIG. 6. The detectors 400 can be designed as described above and/or below and can be arranged in an image plane or focal plane of an image recording system. The detectors 400 are arranged next to one another in the transverse direction. Each detector 400 has two electrical contacts 402. The electrical contacts 402 are arranged on an, in particular lower and/or lateral, edge region of each detector 400. The electrical contacts 402 of a detector 400 are arranged opposite one another with respect to the detector 400 or its longitudinal direction. In each case, one electrical contact 402 is thus arranged on a longitudinal side of the respective detector 400. As can be seen in FIG. 6, the electrical contacts 402 are arranged offset to one another, in particular in the longitudinal direction and/or transverse direction. They are therefore attached asymmetrically to each detector 400. This allows a closer or denser arrangement of the detectors next to one another as shown in FIG. 6, in particular in the transverse direction. Furthermore, this allows for improved heat transport in the center of the ceramic carrier of a detector 400.

As can be seen in FIG. 6, the detectors 400 can have a line-shaped light-sensitive chip. The line-shaped light-sensitive chip can, for example, have a line 404, such as a pixel line 404, having a plurality of pixels in the longitudinal direction thereof (shown in FIG. 6 in the two upper detectors 400). The optoelectronic element, in the transverse direction thereof, can additionally or alternatively have a number of sub-lines 406 arranged parallel to one another, such as sub-pixel lines 406, each having a plurality of pixels. In the present embodiment, as shown schematically in the lower detector 400 of FIG. 6, two sub-pixel lines 406 are provided. The sub-pixel lines 406 are designed and configured in such a way that they are exposed one after the other with a time offset when the detector 400 is in operation. The detector 400 is designed to integrate, in particular, to upwardly integrate, the electrical charges that have arisen in the sub-lines 406 as a result of exposure in columns.

In addition, reference is made in particular to FIGS. 1 to 5 and the associated description.

Figures 7, 8:
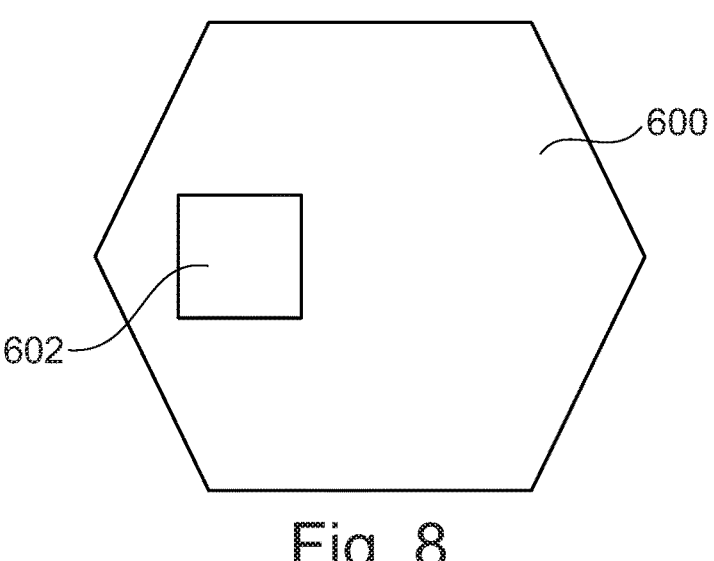
FIG. 7 is an optoelectronic image recording system.
FIG. 8 is a schematic view of an exemplary spacecraft in accordance with the principles of the present disclosure.

FIG. 7 shows an exemplary optoelectronic image recording system 500 for a spacecraft. The optoelectronic image recording system 500 has a carrier plate 502, a connection frame 504, electronics 506, and an isostatic suspension 508. The carrier plate 502, the connection frame 504, and the electronics 506 are connected to one another by means of the isostatic suspension 508. The carrier plate 502 defines an image plane or focal plane. The optoelectronic image recording system 500 also has an arrangement 510 of a plurality of detectors 512 for image recording. Each detector 512 can be designed as described above and/or below. The arrangement 510 of detectors 512 or the detectors 512 are arranged in the image plane or focal plane of an optical system and are fixed on the carrier plate 502. The detectors 512 are arranged next to one another in the transverse direction. In the longitudinal direction, the detectors 512 are arranged next to one another/one behind the other and overlapping in portions in their end regions. The respective pixel lines 404 and/or sub-pixel lines 406 of the detectors 512 overlap in the longitudinal direction in portions in the end region of the respective carrier substrates. Furthermore, the respective pixel lines 404 and/or sub-pixel lines 406 of the detectors 512 are arranged in portions one behind the other in the transverse direction in the end region of the respective carrier substrates. Because of the taper in the end regions of the detectors 512, the overlapping arrangement can be implemented in the longitudinal direction in order to arrange the detectors closer together. The detectors 512 and/or pixel lines 404 and/or sub-pixel lines 406 are designed to detect different spectral ranges.

The connection frame 504 is arranged above the carrier plate 502 and the detectors 512. Optics can be fixed to the connection frame 504. The optics can focus on at least one detector 512 or on all detectors 512 simultaneously or alternately or on the image plane and/or focal plane. The electronics 506 are arranged below the carrier plate 502 and thus on the side of the carrier plate 502 opposite the detectors 512.

In addition, reference is made in particular to FIGS. 1 to 6 and the associated description.

FIG. 8 schematically shows an exemplary spacecraft 600 with an optoelectronic image recording system 602. The optoelectronic image recording system 602 can have at least one detector and be designed as described above and/or below. The at least one detector can be designed as described above and/or below.

The spacecraft 600 may be a satellite or a space probe for high-resolution earth observation. The spacecraft 600 is designed to move in space, in particular along an earth orbit, and to be brought there. The spacecraft 600 can have a drive such as brake nozzles and/or control nozzles or the like.

In addition, reference is made in particular to FIGS. 1 to 7 and the associated description.

The word "may" refers in particular to optional features of the invention. Accordingly, there are also further developments and/or embodiments of the invention which additionally or alternatively have the respective feature or the respective features.

If necessary, isolated features can also be selected from the combinations of features disclosed in the present case and can be used in combination with other features to delimit the subject matter of the claim, while resolving a structural and/or functional relationship that may exist between the features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

100 Detector
102 Carrier substrate
104 End regions
106 Longitudinal direction
108 Oblique side surfaces
109 Transverse axis
110 Protective glass
112 Openings
114 Optical modules
116 Electrical contacting
200 Detector
202 Carrier substrate
204 End region
206 Oblique side surfaces
208 Isosceles trapezoid
210 Light-sensitive chip
212 Spectral filter
214 Passive circuit elements
216 Protective glass
218 Inner region of the protective glass
220 Outer region of the protective glass
222 Integrated signal processing and readout circuit
224 Openings
226 Optical modules
228 Fiber optic connection
230 Electrical contacts
300 Detector
302 Ceramic substrate
304 Integrated signal processing and readout circuit
306 Light-sensitive chip
308 Passive circuit elements
310 Spectral filter
312 Protective pane
314 Optically opaque regions
316 Optically transparent filler
318 Connection
320 Optical connection modules
400 Detector
402 Electrical contacts
404 Pixel line
406 Sub-pixel line
500 Optoelectronic image recording system
502 Carrier plate
504 Connection frame
506 Electronics
508 Isostatic suspension
510 Arrangement of detectors
512 Detectors
600 Spacecraft
602 Optoelectronic image recording system

What is claimed is:

1. A detector for image recording, the detector comprising:

an elongate carrier substrate defining an image plane, and having a longitudinal axis defining a longitudinal direction;

an optoelectronic element arranged on the carrier substrate;

wherein, at least in one longitudinal end region, the carrier substrate has at least one side surface defining a plane that is perpendicular to the image plane and extends obliquely to the longitudinal axis of the carrier substrate; and the carrier substrate has a length along the longitudinal direction that is at least two times greater than a width of the carrier substrate in a direction transverse to the longitudinal direction;

wherein the optoelectronic element extends in the longitudinal direction of the carrier substrate; and wherein the optoelectronic element is a light-sensitive chip.

2. The detector of claim 1, wherein the at least one obliquely extending side surface slopes inward toward the longitudinal axis.

3. The detector of claim 1, wherein at least one end region of the carrier substrate is tapered in a direction along the longitudinal axis.

4. The detector of claim 3, wherein the at least one end region is tapered to define a trapezoidal, triangular, or conical shape.

5. The detector of claim 1, wherein at least one end region of the carrier substrate has substantially the shape of a right-angled or isosceles trapezoid aligned with the longitudinal axis, as seen in a longitudinal section comprising an axis transverse to the longitudinal axis.

6. The detector of claim 1, wherein at least in one end region the carrier substrate further comprises two side surfaces arranged opposite one another and extending obliquely to the longitudinal direction of the carrier substrate.

7. The detector of claim 1, wherein the two side surfaces are arranged opposite one another in a direction transverse to the longitudinal direction of the carrier substrate.

8. The detector of claim 1, wherein each longitudinal end region the carrier substrate further comprises two side surfaces arranged opposite one another and extending obliquely to the longitudinal direction of the carrier substrate.

9. The detector of claim 1, wherein at least one of:

the optoelectronic element comprises a plurality of pixels arranged in a line; or the optoelectronic element comprises a plurality of pixels arranged in sub-lines that are parallel to one another.

10. The detector of claim 9, wherein at least one of:

the line extends in at least one of a longitudinal direction of the optoelectronic element or the longitudinal direction of the carrier substrate;

the sub-lines extend in at least one of the longitudinal direction of the optoelectronic element or the longitudinal direction of the carrier substrate;

the plurality of pixels arranged in a line is a pixel line; or the plurality of pixels arranged in sub-lines are sub-pixel lines.

11. The detector of claim 9, wherein at least one of:

the sub-lines are designed and configured to be exposed with a time offset; or the detector is designed to integrate the electrical charges generated in the sub-lines by exposure in columns.

12. The detector of claim 11, wherein the detector is designed to upwardly integrate the electrical charges generated in the sub-lines by exposure in columns.

13. The detector of claim 1, further comprising a filter element arranged directly on the optoelectronic element or at a distance therefrom.

14. The detector of claim 1, further comprising:

at least one of an integrated signal processing circuit or a readout circuit, which is arranged between the optoelectronic element and the carrier substrate, and is connected to the optoelectronic element.

15. The detector of claim 14, wherein at least one of the signal processing circuit or the readout circuit is designed to at least one of:

process the electrical signals generated by light in the optoelectronic element;

forward the electrical signals generated by light in the optoelectronic element; or convert the analog electrical signals generated by light in the optoelectronic element into digital signals.

16. The detector of claim 14, further comprising:

at least one of:

at least one electrical module for signal transmission, or at least one optical module for digital signal transmission;

the at least one electrical or optical module arranged substantially below at least one of the signal processing circuit or the readout circuit.

17. The detector of claim 16, further comprising:

at least one electrical connection;

at least one of the signal processing circuit or the readout connected via the at least one electrical connection to at least one of:

the at least one electrical module for signal transmission, or the at least one optical module for digital signal transmission.

18. The detector of claim 17, wherein the at least one electrical connection is a conductor track.

19. The detector of claim 1, further comprising at least one electrical contact arranged in an edge region of the carrier substrate.

20. The detector of claim 1, wherein the carrier substrate, at least in portions, has at least one of a substantially U-shaped cross section or a substantially H-shaped cross section.

21. The detector of claim 1, wherein at least one of:

the carrier substrate is made of ceramic material; or the carrier substrate is produced by an additive production method or by 3D printing.

22. An optoelectronic image recording system for a spacecraft, comprising:

a carrier plate; and at least one detector according to claim 1;

wherein the detector is arranged on the carrier plate.

23. The optoelectronic image recording system of claim 22, wherein the detector is arranged on the carrier plate in at least one of an image plane or a focal plane of the recording system.

24. The optoelectronic image recording system of claim 22, comprising at least two detectors, wherein at least one of:

the at least two detectors are arranged on the carrier plate in such a way that, in the longitudinal direction, they overlap at least in portions; or the at least two detectors each include an optoelectronic element comprising at least one of:

a plurality of pixels arranged in a line, or a plurality of pixels arranged in sub-lines that are parallel to one another;

wherein in the longitudinal direction, at least one of the lines having a plurality of pixels, or the sub-lines each having a plurality of pixels, overlap at least in portions.

25. The optoelectronic image recording system of claim 24, wherein at least one of:

the at least two detectors overlap, at least in portions, in the end region of the carrier substrate;

the lines having a plurality of pixels are pixel lines;

the sub-lines having a plurality of pixels are sub-pixel lines; or the lines or sublines overlap at least in portions in the end region of the carrier substrate.

26. The optoelectronic image recording system of claim 24, wherein at least one of the detectors, the pixel lines, or the sub-pixel lines are designed to detect different spectral ranges.

27. The optoelectronic image recording system of claim 22, further comprising optics focusing on at least one of the at least one detector or on an image plane.

28. A spacecraft, comprising at least one detector according to claim 1.

29. A spacecraft, comprising at least one optoelectronic image recording system according to claim 22.

\* \* \* \* \*